Patented Feb. 21, 1950

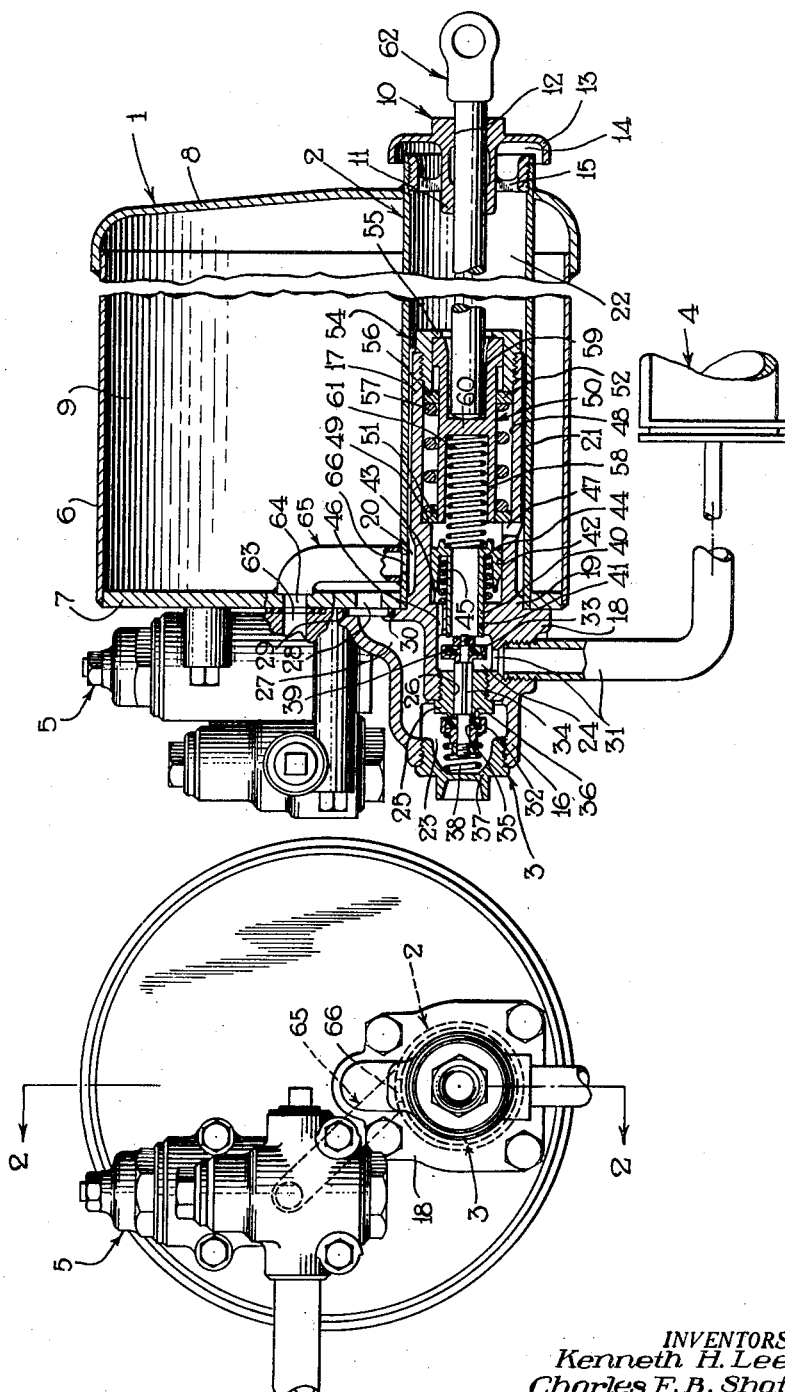

2,498,498

UNITED STATES PATENT OFFICE 2,498,498

FLUID PRESSURE BRAKE APPARATUS

Kenneth H. Leech and Charles F. B. Shattock, London, England, assignors, by mesne assignments, to The Westinghouse Air Brake Company, Wilmerding, Pa., a corporation of Pennsylvania Application January 14, 1947, Serial No. 722,058
In Great Britain February 22, 1946

6 Claims. (Cl. 303—1)

This invention relates to fluid pressure brake apparatus and more particularly to structural improvements therein.

The usual fluid pressure brake systems employed in road and other vehicles comprises brake apparatus which necessarily exhausts fluid under pressure therefrom to the atmosphere during its operation. When this fluid pressure brake apparatus is used on public service vehicles, the noise created by the exhaust therefrom is often objectionable to persons on or near the vehicle.

Such a fluid pressure brake apparatus as usually installed on a vehicle comprises devices which may require periodic attention and inspection and are therefore usually separately mounted on the frame of the vehicle, exposed for the convenience of accessibility. These devices, operably connected by piping, are always subjected to a certain amount of vibration and shock during motion of the vehicle which may be sufficient to break or otherwise cause fluid pressure leaks in the system and consequent operational failure of the brakes. These same devices so situated are often exposed to dust and dirt stirred up by motion of the vehicle which may gain entrance to vulnerable parts thereof, resulting in undue wear, damage, or failure of the equipment.

Therefore, one object of this invention is to provide a fluid pressure brake apparatus which is substantially free from objectionable exhaust noise as described above.

Another object of the invention is to provide a fluid pressure brake apparatus in which the working parts of devices thereof are protected from dust and dirt, while leaving parts which require periodical attention readily accessible.

Still another object of the invention is to provide a fluid pressure brake apparatus with a compact arrangement of devices which will result in economy of space as well as a reduction in the number of pipes required for said apparatus.

In the accompanying drawing; Fig. 1 is an end view of a fluid pressure brake apparatus embodying the invention; and Fig. 2 is a sectional view taken substantially along the line 2—2 on Fig. 1.

Description

As shown in the drawing, the reference numeral 1 indicates a reservoir in which fluid under pressure supplied by a compressor (not shown) may be stored, 2 indicates a hollow tubular member which, according to one feature of the invention, is disposed within the reservoir 1, 3 indicates a control valve device for controlling supply of fluid under pressure from the reservoir 1 to a brake cylinder 4 or other device to be actuated by fluid under pressure and for controlling the release of said fluid therefrom, and 5 indicates a compressor unloader device.

The reservoir 1 may comprise a hollow cylindrical shell 6 to one end of which is welded an end wall 7 and to the opposite end of which is welded an end wall 8, which may be concave. The shell 6 and walls 7 and 8 cooperate to define a reservoir chamber 9.

The tubular member 2 extends longitudinally through the reservoir chamber 9 and through the end walls 7 and 8 to which the opposite ends of said member are respectively welded. An end member 10 is removably secured to one end of the tubular member 2 exteriorly of the reservoir 1, which end member 10 comprises an integral hub portion 11 which has a central through bore 12 coaxial with the tubular member 2. An end cover portion 13 integrally formed with and projecting radially out from the hub portion 11 is curved toward the reservoir end wall 8 at its outer end and forms one wall of a curved annular passage 14, one end of which passage opens outside the reservoir 1 directed toward the outer face of the end wall 8, while the other end opens into the tubular member 2 by way of ports 15.

The control valve device 3 comprises a casing having integrally formed casing portions 16 and 17 at the junction of which is formed a flange 18. The flange 18 is bolted onto the end wall 7, disposing the casing portion 16 outside the reservoir 1 and the casing portion 17 in the tubular member 2 within the reservoir. An annular shoulder 19 of the casing is disposed inside one end of the tubular member 2 for locating the casing portion 17 which is symmetrical, coaxially within the member 2. The peripheral surface of the casing portion 17 cooperates with the inner surface of the tubular member 2 to define an annular exhaust chamber 20 adjacent the shoulder 19 at the inner end of portion 17 and a relatively narrow annular clearance exhaust passage 21 which extends from the annular exhaust chamber 20 to the outer end of the casing portion 17 to open into a relatively large volume exhaust chamber 22 in said tubular member, the outer end of which chamber 22 is open to the atmosphere by way of ports 15 and passage 14 in the end member 10. The casing portion 16, as viewed in the drawing, disposed outside one end of the reservoir 1 adjacent the bottom thereof, lies substantially within transverse clearance dimensions of said reservoir. Two control valve chambers 23 and 24 are provided in the portion 16 which chambers are separated by a removable partition 25 having a central through bore 26 which communicates said chambers one with the other. A cored passage 27 in the casing portion 16 extends from the chamber 23 to the face of the flange 18 opposite to a through port or passage 28 provided in the end wall 8 which port or passage opens to the reservoir chamber 9. A sealing gasket 29 is disposed in a groove 30 in the flange 18 to surround the passage 28 for sealing cooperation with the outer face of the end wall 7. A pipe and passage 31 communicates the chamber 24 in portion 16 with the brake cylinder 4. Supply and discharge control valves 32 and 33, respectively, are coaxially arranged and removably attached to opposite ends of a fluted valve stem 34 which is slidably mounted in the bore 26 in the partition 25.

The control valve 32 is disposed in the chamber 23 and is adapted by provision of a gasket 35 to seat on an annular seat rib 36 which is formed integral with the partition 25 to surround the bore 26 and project into the chamber 23. The valve 32 controls communication between chambers 23 and 24. A removable cap 37 is provided at the outer end of the casing in portion 16 outside the reservoir 1 forming a wall of the chamber 23. The cap 37 allows for removal of the valve 32, the partition 25, and the valve 33. A spring 38 disposed in the chamber 23 bears against the cap 37 at its one end and the valve 32 at its opposite end to urge said valve to seat on the rib 36.

The control valve 33 is disposed in the chamber 24 and is adapted by provision of a gasket 39 to seal against one end of a sleeve 40 which is in slidable relationship with a bore 41. The sleeve 40 extends through the bore 41 and projects into a larger bore 42 coaxial with the bore 41 and with the casing portion 17 in which it is contained. An annular shoulder 43 is formed in the casing at the junction of the bores 41 and 42. A guide sleeve piston 44 is integrally attached to the projecting end of the sleeve 40 which piston is slidably mounted in the bore 42. A bias spring 45 is disposed around the sleeve 40 in the bore 42 which spring is compressed by cooperation with the shoulder 43 at one end and at the opposite end by contact with the piston 44 to urge the attached sleeve 40 away from the control valve 33. A passage 46 is provided in the casing for communicating the chamber 24 with the bore 42 on the spring side of the piston 44. Exhaust port or ports 47 are provided in the casing portion 17 which open the outer end of the bore 42 to the annular chamber 20.

A central bore 48 is provided in an enlarged portion of casing portion 17, the outer surface of which portion defines the annular clearance exhaust passage 21 by cooperation with the inner wall of the tubular member 2. The bore 48 extends from the outer end of casing portion 17 to the bore 42 within, at which junction is formed an annular shoulder 49. A cylindrical actuating member 50 is slidably mounted inside two annular rings 51 and 52 which in turn are slidably mounted in the bore 48. A removable retaining ring 54, provided in the outer end of the bore 48, comprises an integral stop rib 55 which projects into the path of travel of the actuating member 50. One end of the ring 54 forms an annular stop shoulder 56 which projects into the path of travel of the annular ring 52. A spring 57 is disposed around the member 50 between the annular rings 51 and 52 and bears against opposite faces thereof, urging said rings to separate. The ring 52 seats on the shoulder 56 of the retaining ring 54, while the ring 51 seats on the shoulder 49.

Two central bores 58 and 59 open into opposite ends of the cylindrical actuating member 50, the inner ends of which bores define a partition 60 in said member. One end of a control spring 61 projects through the bore 58 to bear against a respective face of the partition 60, while the opposite end bears against one face of the guide sleeve piston 44 to urge said piston and attached sleeve 40 apart from the actuating member 50. One end of an operating rod 62 abuts against the opposite face of the partition 60, said operating rod being slidably mounted in the bore 12 and projecting through the chamber 22 in the tubular member 2 into the bore 59 in the actuating member 50. The operating rod 62 may be operable in any desired manner, as by a foot pedal (not shown).

The compressor unloader device 5 may be of the type which controls the supply of fluid under pressure from a compressor to the reservoir 1 in response to pressure of fluid contained therein. With this type of control the compressor operates continuously, while the unloading device 5 is arranged to load the compressor to cause fluid under pressure to be supplied to the reservoir 1 when the demand dictates and to unload the compressor by exhausting the discharge of fluid therefrom to the atmosphere when the demand drops off. 63 indicates a passage through which fluid is adapted to be exhausted to the atmosphere for unloading the compressor as just described. Unloaders of this general type are so well known that no further description thereof is essential in the present apparatus for an understanding of the invention.

The compressor unloader passage 63 opens into a port or passage 64 through the end wall 7. One end of a conduit 65 is welded to the inside face of the end wall 7 to enclose the port 64, while the opposite end is welded to the outer surface of the tubular member 2 to surround a port 66 extending through said member, which port opens into the annular exhaust chamber 20.

*Operation*

In operation, let it be assumed that the reservoir chamber 9 is charged with fluid under pressure and that the parts of the control valve device 3 are in the position as shown in Fig. 2, in which the control valve 32 is seated against the rib 36 by spring 38 so that fluid under pressure from chamber 9 is closed off from the chamber 24, and the sleeve 40 is withdrawn from the valve 33, opening the chamber 24 and the brake cylinder 4 to the atmosphere by way of the sleeve 40, the bore 42, the port or ports 47, the annular exhaust chamber 20, the clearance passage 21, the chamber 22, and the ports 15 and passage 14 in the end member 10.

To close off communication of the brake cylinder 4 to the atmosphere and to open the reservoir chamber 9 to the brake cylinder 4, the operating rod 62 is moved toward the left, viewing it as shown. In so moving, the end of the operating rod 62, abutting against one face of the partition 60, carries with it the actuating member 50 to exert a force on one end of the control spring 61 which in turn exerts a force on the guide sleeve piston 44 which overcomes the opposing action of the relatively weaker bias spring 45 to move the sleeve piston 44 and attached sleeve 40 toward the discharge control valve 33. Continued movement of the operating rod 62 thus acting on the sleeve 40 moves the open end of said sleeve into contact with the gasket 39 on the discharge control valve 33 to close off communication from the chamber 24 to the exhaust port or ports 47 by way of the sleeve 40 and the bore 42. Further movement of the operating rod 62 then further compresses the control spring 61 to cause the sleeve 40 to exert a force on the control valve 33 sufficient to unseat the attached supply valve 32 against the opposing action of the spring 38. The supply valve is thereby opened to allow the fluid under pressure supplied to the chamber 23 from the reservoir chamber 9 by way of the passage 27 and the port 28 to flow through the bore 26 into the chamber 24, hence through the passage and pipe 31 to the brake cylinder 4. As fluid under pressure thus flows through the chamber 24 to the brake cylinder 4, it also flows from said chamber through the passage 46 to the chamber at the left hand face of the piston 44 on which it acts against the opposing force of the spring 61, and when the pressure of said fluid is increased to a sufficient degree to overcome said spring, said piston moves against said spring 61 to allow the spring 38 to return the supply control valve 32 to lap with the rib 36 to close off supply of fluid under pressure to the brake cylinder 4. Movement of the operating rod toward the right reduces the pressure of the spring 61 on the piston 44 which allows the bias spring 45 to move the sleeve 40 out of contact with the gasket 39 on the discharge control valve 33 so that fluid under pressure from the brake cylinder 4 is exhausted through the chamber 24, the sleeve 40, the bore 42, the port or ports 47, the chamber 20, hence to the atmosphere as previously described.

Since the reservoir chamber 9 is charged with fluid under pressure let it be assumed that said pressure is sufficient to cause unloading of the compressor (not shown), then the compressor unloader device 5 will be exhausting the fluid discharged from said compressor, which operates continuously, through its exhaust port 63, into the port 64 in the end wall 7, through the conduit 65 within the reservoir chamber 9, through the port 66 in the tubular member 2, into the chamber 20, whence it will flow to the atmosphere as above described.

In flowing to the atmosphere, fluid from both the brake cylinder 4 and compressor unloader device 5 exhausts into the chamber 20, whence it passes through the relatively narrow passage 21 at the operating rod end of the control valve and expands into the relatively large volume chamber 22 of the remainder of the tubular member and finally escapes to the atmosphere through the end member 10 at relatively low velocity. Any sound from the exhaust of fluid thus discharged to the atmosphere is thereby muffled after leaving the chamber 20. The location of the tubular member 2 within the reservoir has an additional muffling effect on exhaust of fluid through said member, and the inside face of the cover portion 13 of the end member 10 serves to reflect sound waves back into the chamber 22 to prevent their transmission to the atmosphere, providing further muffling.

Having now described the invention, what is claimed to be new and is desired to be secured by Letters Patent is:

1. In fluid pressure apparatus, the combination of a reservoir comprising a hollow cylindrical shell closed at one end by an end wall and closed at an opposite end by another end wall, a tubular member extending longitudinally through said reservoir from said one wall to said other wall and having therein a silencing chamber which is open to the atmosphere, a control valve device mounted on one of said end walls and projecting substantially into said tubular member, said device comprising a casing having an exhaust port which is open to said silencing chamber, a compressor unloader device mounted on said one end wall and having a fluid exhaust port, and means establishing communication between said exhaust port and said silencing chamber.

2. In fluid pressure apparatus, in combination, a reservoir for storing fluid under pressure, silencing means within said reservoir and open to the atmosphere, a compressor unloader device mounted exteriorly on said reservoir, said device having a fluid exhaust port, and means within said reservoir establishing communication between said exhaust port and said silencing means.

3. In fluid pressure apparatus, in combination, a reservoir comprising a cylindrical shell enclosed at each end by an end wall to form a chamber for storing fluid under pressure, a hollow member extending through said reservoir and sealed off from said chamber, a fluid pressure control device comprising a casing adapted to be mounted exteriorly of said reservoir on one end of said hollow member, said casing having a cored passage communicating said chamber with said fluid pressure control device, and an operating rod extending into the opposite end of said hollow member for actuating the control device.

4. In fluid pressure apparatus, in combination, a reservoir comprising a cylindrical shell enclosed at each end by an end wall to form a chamber for storing fluid under pressure, a hollow member extending through said reservoir sealed off from said chamber, a fluid pressure control device comprising a casing mounted exteriorly of said reservoir on one of said end walls and extending into one end of said hollow member, said device comprising means for controlling release of fluid under pressure from said chamber, an end member disposed at the opposite end of said hollow member, said end member being provided with a central thru bore, and an operating rod slidably disposed in and extending thru said bore into said hollow member for actuating said control means.

5. In fluid pressure apparatus, a reservoir, a tube extending thru said reservoir and cooperating therewith to form a fluid pressure storage chamber encircling said tube, a control valve device mounted on said reservoir over one end of said tube and comprising a casing portion extending into said one end of said tube, said portion cooperating with said tube to provide a relatively restricted annular passage connecting a fluid pressure exhaust cavity in said portion to a relatively large fluid pressure receiving volume in said tube at the end of said portion, and means closing the opposite end of said tube having an exhaust passage connecting said volume to atmosphere and so constructed as to direct exhaust fluid toward the outer surface of said reservoir.

6. In fluid pressure apparatus, a reservoir, a tube extending thru said reservoir and cooperating therewith to form a fluid pressure storage chamber encircling said tube, a control valve mounted on said reservoir over one end of said tube and comprising a portion extending into said one end of said tube, said portion cooperating with said tube to provide a relatively restricted annular passage connecting a fluid pressure exhaust cavity in said portion to a relatively large fluid pressure receiving volume in said tube at the end of said portion, means closing the opposite end of said tube having an axial bore and an exhaust passage connecting said volume to atmosphere, and an operating rod for said control valve extending thru said tube and axial bore.

KENNETH H. LEECH.
CHARLES F. B. SHATTOCK.

REFERENCES CITED

The following references are of record in the file of this patent:

UNITED STATES PATENTS

| Number | Name | Date |
|---|---|---|
| 674,808 | Christensen | May 21, 1901 |
| 732,789 | Smart | July 7, 1903 |
| 1,141,159 | Turner | June 1, 1915 |
| 1,772,589 | Beamer | Aug. 12, 1930 |
| 2,239,549 | Chipley | Apr. 22, 1941 |